July 10, 1923.

J. H. STALEY 1,461,463

STRAIGHTENING PRESS AND METHOD OF USING SAME

Filed March 1, 1921

Inventor,
Joseph H. Staley
By Joseph A. Minturn
Attorney.

Patented July 10, 1923.

1,461,463

UNITED STATES PATENT OFFICE.

JOSEPH H. STALEY, OF COLUMBUS, INDIANA.

STRAIGHTENING PRESS AND METHOD OF USING SAME.

Application filed March 1, 1921. Serial No. 448,879.

*To all whom it may concern:*

Be it known that I, JOSEPH H. STALEY, a citizen of the United States, residing at Columbus, in the county of Bartholomew and State of Indiana, have invented new and useful Improvements in Straightening Presses and Methods of Using Same, of which the following is a specification.

This invention relates to the method and means for taking the bends and crooks out of propeller shafts, crank shafts, and shafting in general which must be straight to afford the greatest element of efficiency in its rotatable use; and the object of the invention is to provide adjustable centers on and between which the shaft to be straightened may first be rotated and its fault located and measured, and to provide a press adjacent thereto to which the shaft may be conveniently and quickly transferred from said centers and the required pressure brought to bear where needed, to remove the faults and straighten the shaft; and the object is to provide means for determining when the shaft-centers are not true.

A further object is to provide such a combined machine in which the fault locating and measuring member will not be in the way of the work or workman in operating the straightening portion of the machine, while being sufficiently convenient for repeated testings as the work of straightening the shaft progresses.

Figure 1:
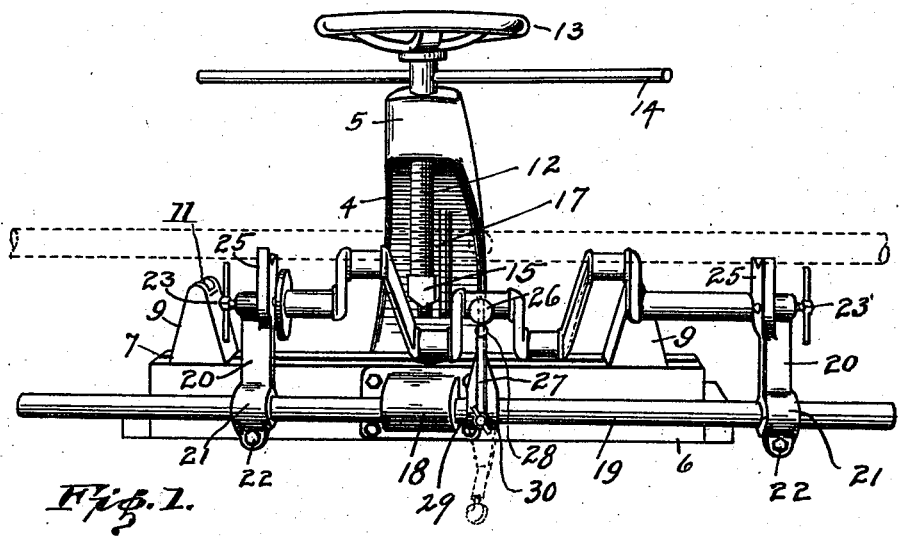
Figure 2:
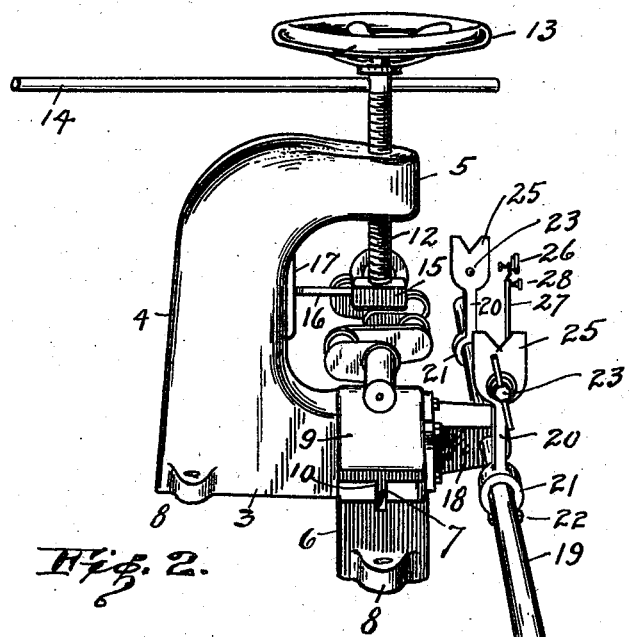

I accomplish the above and other objects which will hereinafter appear, by the mechanism illustrated in the accompanying drawing, in which:

Fig. 1, is a front perspective view of my invention with an engine crank shaft in position between centers for locating and measuring faults therein. This figure shows in dotted lines the manner of testing a shaft that cannot be centered. Fig. 2 is a perspective view in side elevation of the device of Fig. 1. but with the crank shaft transferred from the fault locating and measuring part to the straightening press.

Like characters of reference indicate like parts in the several views of the drawing.

The base 3, standard 4 and forwardly overhanging head 5 are in one piece cast iron or steel, heavy and strong enough to withstand the strain that they will be subjected to without breaking, and cast integral with the front end of the base is a cross member 6 having a longitudinal groove 7 extending from end to end thereof. Perforated ears 8, cast integral with the base and extension afford means for bolting the machine to a bench or other suitable support. A pair of bearing blocks 9, 9, with broad bases to insure ample bearing surface upon the cross member 6, have underside flanges 10 that make a close rubbing fit in groove 7, to keep the blocks from rotating while allowing them to be moved toward or away from each other upon said cross member. These have top recesses 11 as seats for shafting to be supported on said blocks.

The head 5 has a vertical screwthreaded hole through which a correspondingly screwthreaded shaft 12 is screwed. A hand wheel 13, is mounted in a fixed manner on the upper end of the screw shaft 12, above the head 5, for quick manipulation in adjusting the screw up or down, and passing through a hole through an enlarged diameter of the shaft between the wheel 13 and the head 5, is a longitudinally adjustable shaft-lever 14 by which the screw shaft is usually rotated in the shaft-straightening operations. The lower end of the screw shaft carries a swivelled bearing block 15, preferably bevelled on its bottom to nearly a bearing edge in order to concentrate the pressure applied through the block, and to keep the block 15 from twisting around with the screw shaft under the pressure of the latter I prefer to provide a pin 16, one end of which is seated in the block and the other end in a vertical channel 17 in the adjacent face of the standard 4.

Fastened to the cross member 6 of the base, in front and to the middle thereof, here shown as by means of bolts, is a bracket 18 with a horizontal hole through it in which a shaft 19 is mounted. A pair of standards 20, 20, adjustably mounted on this shaft, each have clamp-ends 21 with drawbolts 22 by which they may be secured at any given position. Heads at their upper ends have threaded holes that receive set screws 23. The ends of the screws, projecting toward the middle of the machine, are conical to act as center pins, and cross bars through the outer ends afford means for rotating the screws. The standards are set the proper distance apart, depending upon the length of the shaft to be held by them, and the shaft to be held is then centered on the conical ends of screws 23.

For shafts that are too long, or that have not been provided with proper center holes or in which the center holes have become battered and untrue, I provide standard extensions 25 which are suitably notched at their upper ends to provide seats to receive and hold the shaft, as one is shown by the dotted lines in Fig. 1. In either case, the shaft to be tested is rotated by hand and the bend in it is measured by means of a gauge 26. This gauge is supported by a telescopically adjustable standard 27, the members of which are held by a set screw 28 at any desired heighth above a clamp 29 supported on the shaft 19. By loosening the clamp the gauge may be swung down out of the way to the position shown in dotted lines in Fig. 1, and held up in operative position shown by the full lines by tightening its set screw 30.

In the operation of my machine the shaft to be straightened is first tested and its error measured by the gauge, with the shaft either between the centers on screws 23 or seated in the notches of extensions 25. Then the shaft is removed and is placed in the recessed seats of the blocks 9, 9, either before or after which, the blocks are moved to the respective limits of the error in the shaft to be corrected. With the high point of the error uppermost the shaft, as above supported by the blocks 9, 9, is subjected to pressure from the screw shaft 12, acting through the block 15 which contacts the shaft to be straightened. The perfection of the operation is tested by returning the shaft to the supports and gauge as first described. By the close position of the shaft testing part of the machine to the straightening part the highest point and also the limits of the error in the shaft are located, which enables the blocks of the straightening press to be properly placed and the progress of the correction easily tested. But one of the most important features of my invention is the means for determining whether or not the centers of a shaft having centers are faulty. For error in the centerholes of the shaft to be straightened will mislead the workman who relies on tests made with the shaft rotating about center pins 23. If the gauge indicates the same error when the shaft is rotated on pins 23 as when rotated in the notches of extensions 25 it may be safely assumed that the centerholes in the shaft are correct; otherwise that they are not and the tests must be made by aid of the notched extensions.

Having thus fully described my invention, what I claim as new and wish to secure by Letters Patent of the United States, is:

1. In a shaft straightening machine, means to test a shaft having center holes comprising a gauge, a pair of center pins on which the shaft is mounted and rotated, and means to test the accuracy of the center holes in the shaft comprising additional supports with recesses in which the shaft is placed and rotated said gauge being adjustable to the two positions of the shaft.

2. The combination with a shaft-straightening press, of means to test a shaft having center holes, comprising a rockable shaft, a pair of center pins rockable with said shaft on which pins the shaft to be tested is rotated, additional higher shaft supports also rockable with the center supports, and a gauge mounted on the rockable shaft and adjustable in its distance from the latter to reach the shaft undergoing test when held by the center pins or on the higher supports.

3. The combination with a shaft-straightening press, of means to test a shaft having center holes, comprising a rocking shaft, a bracket, a pair of standards adjustably secured to the rocking shaft each having an adjustable center screw to support the shaft to be tested, and each standard having a notched extension in which the shaft under test is further tested, a gauge, and a telescoping support adjustably connecting the gauge with the rocking shaft whereby the gauge may be moved to the different positions of the shaft under test.

4. The herein described method for testing the accuracy of center holes in a cylindrical member; comprising the positioning of said member between peripheral supports, gauging the same, positioning said member between supports entering said center holes and again gauging said member, substantially as set forth.

5. The herein described method of testing the position of a center hole in a cylindrical member, which consists in supporting said member peripherally, gauging the member while rotating it peripherally, supporting said member from its center hole and again gauging the member while rotating it from its center hole support, substantially as set forth.

Signed at Columbus, Indiana, this the 21 day of Feby., 1921.

JOSEPH H. STALEY.